US005187798A

United States Patent [19]

Nambudiri et al.

[11] Patent Number: 5,187,798

[45] Date of Patent: Feb. 16, 1993

[54] ELECTRONIC POSTAGE METER HAVING SEPARATE FUNDS CHARGE REGISTERS AND RECREDITS FUNDS REGISTER IN PREDETERMINED AMOUNT WHEN FUNDS FALL TO PREDETERMINED LEVEL

[75] Inventors: Easwaran C. N. Nambudiri, Rye Brook, N.Y.; Arno Muller, Westport; Wallace Kirschner, Trumbull, both of Conn.

[73] Assignee: Pitney Bowes Inc., Stamford, Conn.

[21] Appl. No.: 319,456

[22] Filed: Mar. 6, 1989

[51] Int. Cl.[5] .............................................. G06F 15/20

[52] U.S. Cl. ............................... 395/800; 364/918.52; 364/918; 364/920; 364/965.79; 364/DIG. 2; 364/464.02

[58] Field of Search ... 364/200 MS File, 900 MS File, 364/464.02; 395/600, 800

[56] References Cited

U.S. PATENT DOCUMENTS

| | | | |
|---|---|---|---|
| 3,978,457 | 8/1976 | Check | 364/200 |
| 4,525,786 | 6/1985 | Crowley | 364/900 |
| 4,534,018 | 8/1985 | Eckert | 364/900 |
| 4,549,281 | 10/1985 | Eckert | 364/900 |
| 4,706,215 | 11/1987 | Kirschner | 364/900 |
| 4,807,141 | 2/1989 | Muller | 364/464.02 |
| 4,811,234 | 3/1989 | Storace | 364/900 |
| 4,835,697 | 5/1989 | Jones | 364/900 |
| 4,845,632 | 7/1989 | Kroll | 364/200 |
| 4,858,138 | 8/1989 | Talmadge | 364/464.02 |
| 4,858,174 | 8/1989 | Caville | 364/900 |
| 4,916,623 | 4/1990 | Check | 364/464.02 |
| 4,958,291 | 9/1990 | Mamone | 364/464.02 |

*Primary Examiner*—Thomas C. Lee
*Assistant Examiner*—Eric Coleman
*Attorney, Agent, or Firm*—Charles G. Parks, Jr.; Melvin J. Scolnick

[57] ABSTRACT

In an electronic postage meter, two accounts are maintained in non-volatile memory. One account represents the funds available for the postage meter and the other is an account representing operational funds. The operational funds account is accessed and updated in meter trips. The other is accessed when operating funds reach a predetermined level. In a first embodiment, the first register is disposed in a low endurance non-volatile memory while the second register is disposed in a high endurance device which has lower retention capability. The non-volatile memory in which the first register is disposed may be maintained at power-down or power-savings condition during trip cycles and other system operations in order to protect the funds stored in the first register.

9 Claims, 5 Drawing Sheets

ELECTRONIC POSTAGE METER HAVING SEPARATE FUNDS CHARGE REGISTERS AND RECREDITS FUNDS REGISTER IN PREDETERMINED AMOUNT WHEN FUNDS FALL TO PREDETERMINED LEVEL

FIELD OF THE INVENTION

The invention relates to electronic postage meters and more particularly to the storage of data in non-volatile memory in such electronic postage meters.

BACKGROUND OF THE INVENTION

Electronic postage meters are well known. Such devices operate under microprocessor control to perform printing and accounting operations associated with the printing of a postal indicia on an envelope. In known meters such accounting may be carried out in a volatile memory and then transferred at a predetermined time to non-volatile memory for storage in the event that power is removed from the electronic postage meter. Alternatively, in other conventional meters all computations are carried out in battery-backed CMOS RAM non-volatile and there is no need for transfer from RAM in the event of power loss in the meter.

In these conventional electronic postage meters, each of the non-volatile memories used for storing the postal funds information must have both long retention times for the stored data, typically specified as approximately ten years for critical postage meter data, and a high endurance. Endurance is defined as the maximum number of times that a byte of data can be overwritten at a given address in memory. High endurance memories typically allow write operations of the order of 10,000 to 1,000,000 write cycles for a given byte. By contrast, low endurance memories typically allow write operation on the order of 10,000 or less.

Battery-backed RAMs work well, particularly in terms of endurance, but have the drawback that battery life which is critical for the retention of data is less than the life of the postage meter. Other nonvolatile memories such as the known MNOS devices are typically of low endurance, less than 10,000 write cycles. Devices such as the $E^2$PROM available from SEEQ Technology which combine high retention and high endurance of up to 1,000,000 write cycles are relatively expensive.

Various techniques have been used in conjunction with the lower endurance devices to overcome the handicap of limited write cycles while at the same time ensuring that critical accounting data is not lost either because the data has been corrupted in the memory or was improperly stored or improperly transferred to non-volatile memory.

U.S. Pat. No. 4,301,507 disclosed the real time accounting in RAM and storage in an MNOS memory only when power is removed from the meter. Eckert in U.S. Pat. No. 4,584,647 teaches a ring counter arrangement for storing counting data in a sequence of addresses in non-volatile memory from which postage value may be calculated based on the number of counts stored in the ring counter.

U.S. Pat. No. 4,706,215 of Kirschner et. al. discloses a postage meter having two non-volatile memories wherein data is stored in real time in one non-volatile memory and in a limited endurance memory on power-down.

U.S. application Ser. No. 292,194, filed Dec. 30, 1988 now U.S. Pat. No. 5,012,425 to Brown entitled ELECTRONIC POSTAGE METER HAVING AN IMPROVEMENT IN NONVOLATILE STORAGE OF ACCOUNTING DATA assigned to the Assignee of the instant application describes a redundant non-volatile memory arrangement comprising storage buffers in two-different types of non-volatile memory and in which postage meter register data may be updated or reconstructed on the basis of count data stored in a circular counter in a limited endurance device.

EPC Application No. 88104948 (Pub. No. 0285087) divides the postage meter accounting register information into high-weight and low-weight digit information and stores the lower weight digit information in a zone of the memory arranged as a circular storage area. The higher weight digit information is stored in a zone of the memory in conventional manner.

While these known techniques accomplish the result of enabling the use of a low endurance devices in the postage meter, each relies on a compromise between long retention and endurance.

SUMMARY OF THE INVENTION

It is therefore an object of the invention to provide apparatus and a method of accounting in the non-volatile memory of a postage meter which will protect the bulk of stored funds under worst case conditions.

It is another object of the invention to assure that only a small portion of the funds is exposed to system noise, run-away conditions, thermal stress and catastrophic system failures.

It is another object of the invention to provide a non-volatile storage of postage meter funds in two non-volatile memory devices in which one device requires only a high data retention characteristic with limited endurance to hold the bulk of stored funds and the other requires only a high endurance characteristic which can be traded-off against the need for long data retention.

In accordance with the invention, there is provided a method for accounting for postage funds in the non-volatile memory of a postage meter comprising the steps of providing a first storage register in non-volatile memory for storing data representing total funds available for expenditure, a second storage register for storing meter operating funds, said first register being accessed only when the funds in said second register are substantially depleted by postage metering operations.

In a preferred embodiment, the first register is disposed in a low endurance non-volatile memory while the second register is disposed in a high endurance device which has lower retention capability. For best results, the non-volatile memory in which the first register is disposed is maintained at power-down or power-savings condition during trip cycles and other system operations in order to protect the the funds stored in the first register.

Further features and advantages of the method and apparatus in accordance with the invention will be understood from the description in conjunction with the drawing.

DESCRIPTION OF THE PREFERRED EMBODIMENT

Figure 1:
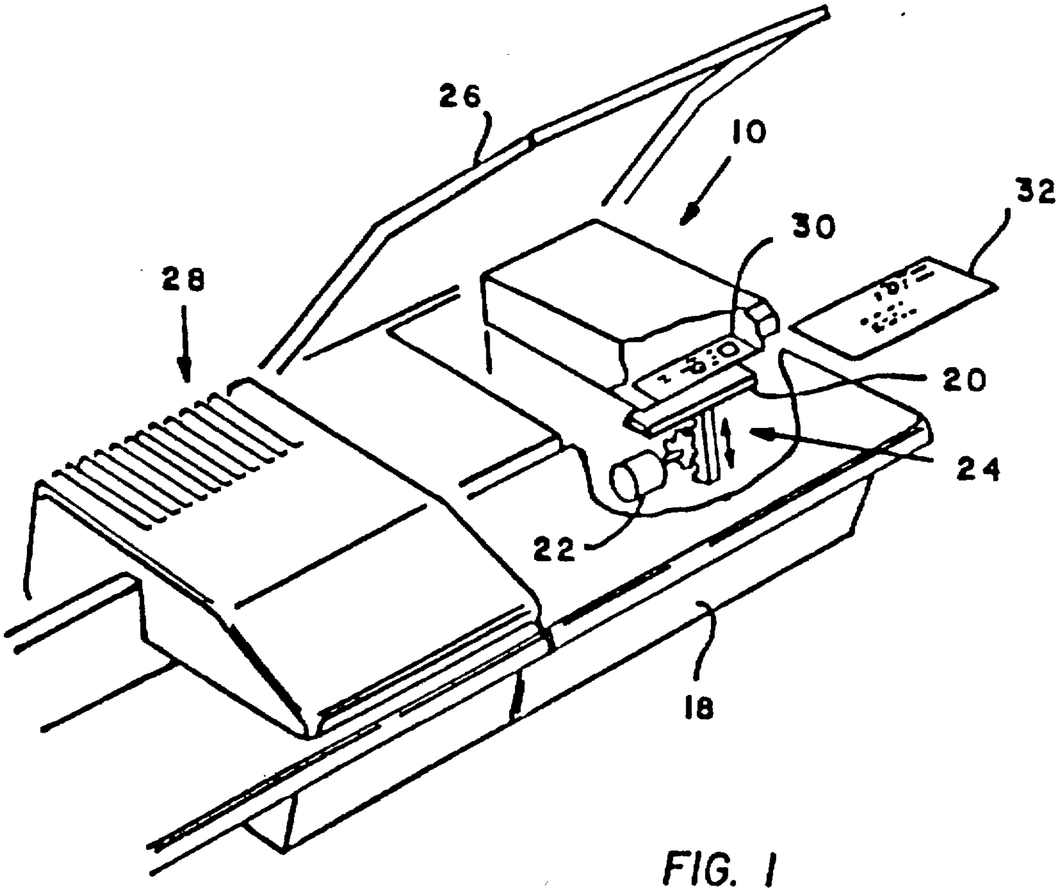
FIG. 1 is a perspective view of an electronic postage meter in which the invention may reside.

In FIG. 1, there is shown an electronic postage meter at 10. The meter 10 may have a keyboard and display (not shown) suitably covered by a door or a sliding fixture (not shown in this Figure). The meter 10 is shown installed in position on a mailing machine 18. The mailing machine 18 includes, as schematically shown, a printing platen 20 driven by motor 22 which reciprocates platen 20, suitably via rack and pinion gears 24. The entire meter is suitably enclosed in the mailing machine by hinged cover 26. Feeder module 28 feeds mailpieces to the base 18 which in turn transports the mailpiece to the space between the print die 30 and the platen 20 where upon reciprocation of the platen an imprinted indicia is placed upon the mailpiece as shown on mailpiece 32 being ejected from the mailing machine 18.

Printwheels (not shown) within the meter 10, set by stepping motors or other means (also not shown), are arranged to print postage value on the envelope in conjunction with the remainder of the indicia. Further aspects of this meter are detailed in U.S. application Ser. No. 114,363, filed Oct. 27, 1987 now U.S. Pat. No. 4,876,956 entitled A REMOVABLE POSTAGE METER HAVING AN INDICIA COVER, assigned to the assignee of the present invention.

Figure 2:
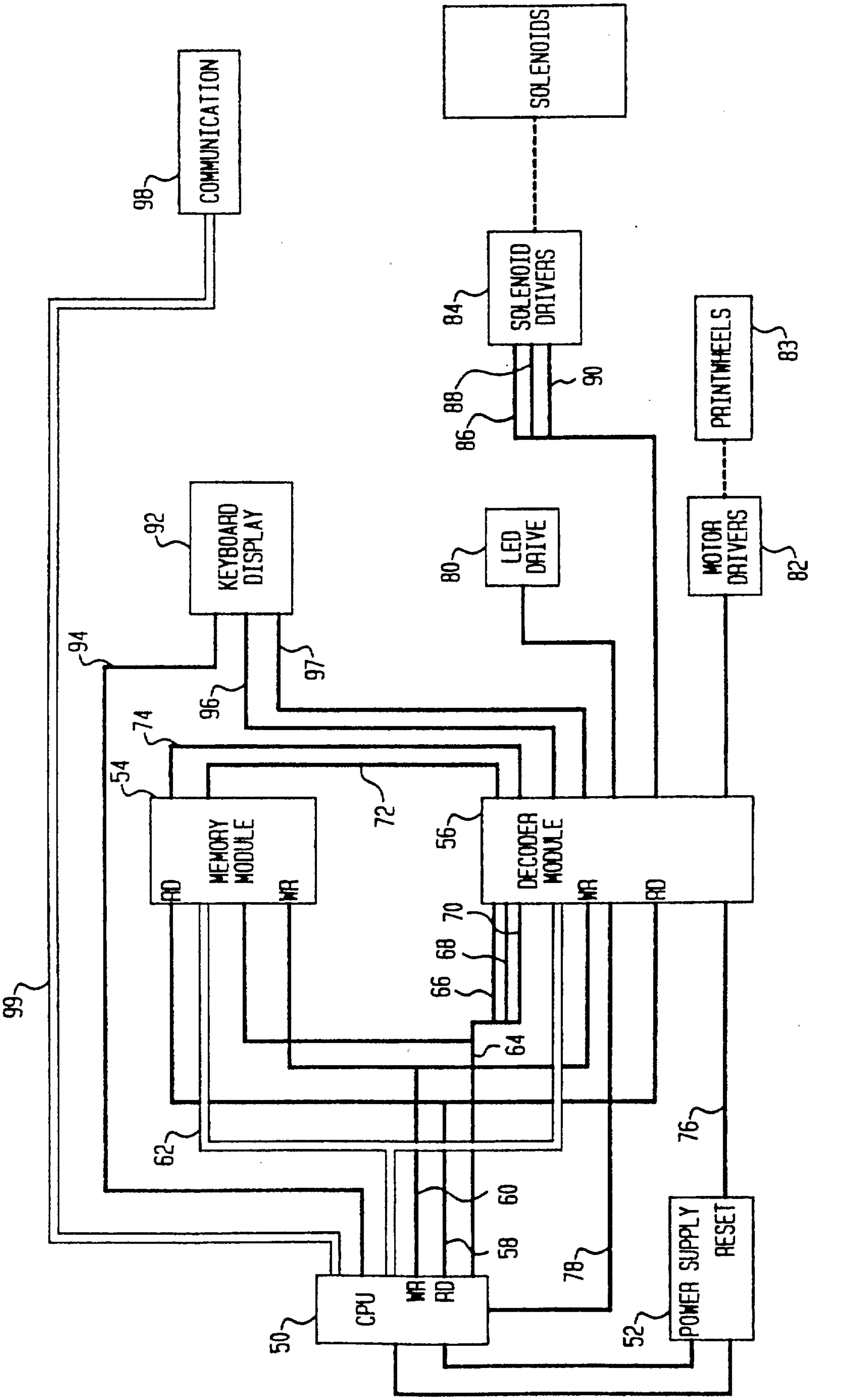
FIG. 2 is a schematic block diagram of the electronic postage meter.

FIG. 2 is a circuit block diagram of the electronic postage meter. As seen in FIG. 2, the Central Processing Unit (CPU) 50, suitably a Model 8031 available from Intel, Santa Clara, Calif., receives its power from the power supply 52. The CPU 50 communicates address and data signals along with memory READ and WRITE signals in known manner to memory module 54 as well as to the decoder module 56. Read signals are transmitted to both on line 58 and WRITE signals on line 60, respectively. The multiplex address/data bus between the modules is shown at 62. Address bus 64 is also connected between the CPU 50 and memory module 54. The three highest order address lines 66, 68, and 70 are also connected to the decoder module 56. NVM READ and NVM WRITE signals are developed in the decoder module 56 under command of the CPU 50 and are connected to memory module 54 on lines 72 and 74.

The decoder 56 receives a CPU reset signal from power supply 52 on line 76 and with suitable internal logical manipulation in combination with other developed signals in the decoder module 56 provides a CPU reset signal to CPU 50 on line 78. A suitable circuit for providing a reset signal dependent on power and voltage conditions in the power supply is shown, for example, in Muller U.S. Pat. No. 4,547,853. A logic circuit for monitoring the reset from the power supply as well as other circuit parameters for developing a reset signal to the CPU is shown, for example in U.S. Pat. No. 4,747,057. A decoder chip is described in U.S. Pat. No. 4,710,882. As illustrated, the CPU 50 further communicates with LED drive module 80 to provide signals for the various sensors, the various stepper motor drivers (shown at 82) for positioning the postage meter printwheels (shown at 83), and solenoid drivers shown at 84 for controlling die-protector solenoids along lines 86, 88, and 90, respectively, through the decoder 56.

Keyboard display module 92 receives and displays information to the CPU 50 in conventional manner on line 94. Information is also provided from the keyboard of the keyboard/display module 92 to decoder 56 along line 96 in response to a strobe from the decoder 56 on line 97. External communications to the CPU are channelled through communication module 98 to the CPU on line 99. Typical features and the operation of postage meters are discussed, for example, in U.S. Pat. No. 4,301,507 and U.S. Pat. No. 4,484,307, both herein specifically incorporated by reference, and will not be further discussed.

Figure 3:
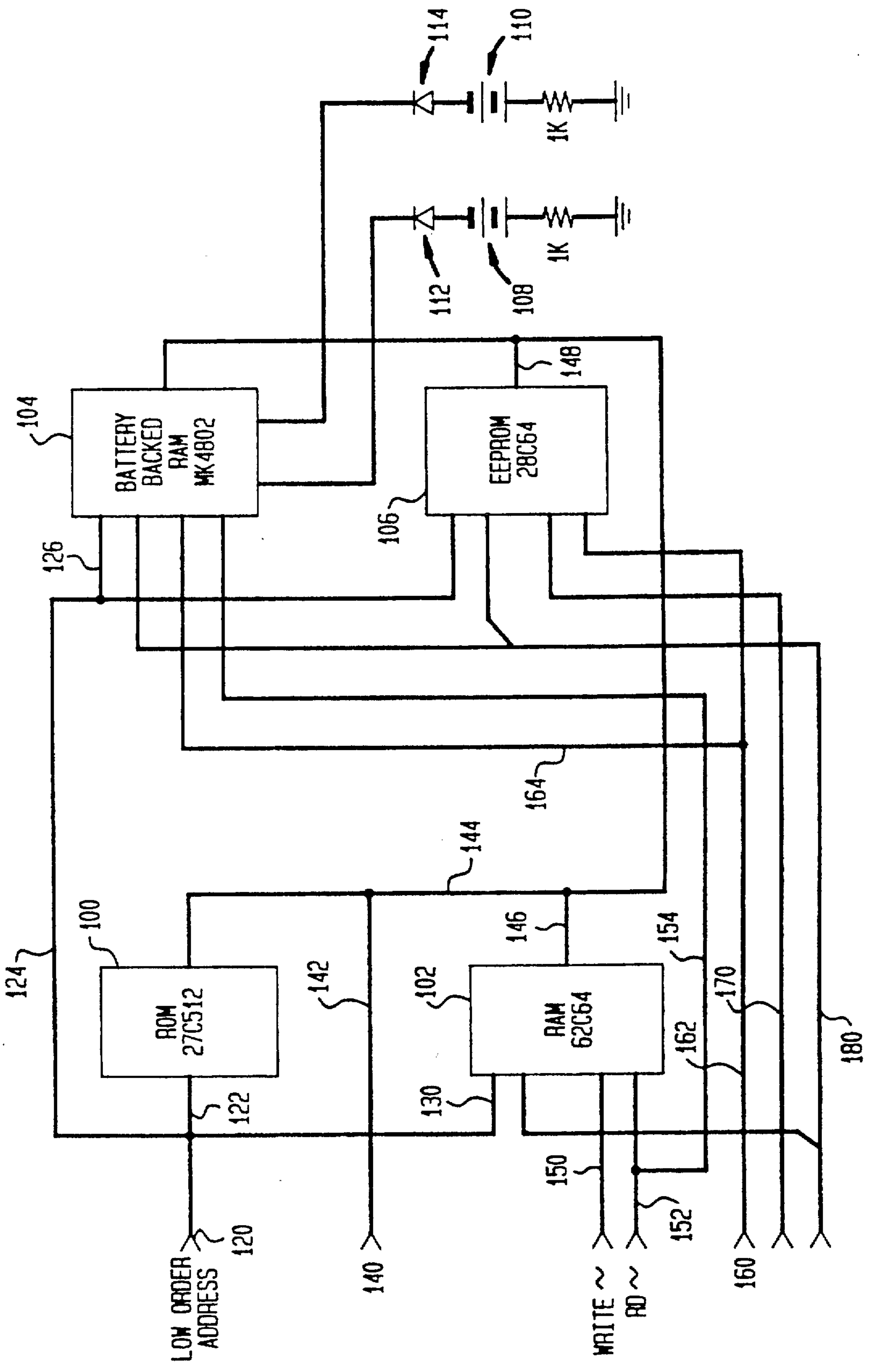
FIG. 3 is a circuit diagram of the memory module in the electronic postage meter.

FIG. 3 is a block diagram of a suitable memory module 54 in the electronic postage meter. Memory module 54 comprises a Read Only Memory (ROM) 100 suitably Model 27C512 available from General Instruments, a CMOS random access memory (RAM) 102 such as Model number 62C64 available from NEC, a battery-backed CMOS RAM for non-volatile memory suitably Model number MK4802, available for example, from SGS-Thompson, at 104, and an $E^2$PROM device 106 suitably a Model 28C64 available, for example, from Atmel. For best results, the battery-backed RAM 104 is connected to receive voltages from batteries 108 and 110, each connected through diode 112 and 114, respectively, to the battery-backed RAM 104. Low order address data is furnished to each of the memories at input point 120 and is transmitted along connecting busses shown at 122, 124, 126, and 130. Multiplexed address and data are communicated to the module at input point 140 and communicated to the various memory devices along connecting busses shown at 142, 144, 146, and 148. The WRITE signal to RAM 102 is provided on line 150. A READ signal is sent along line 152 to both the RAM 102 and battery-backed RAM 104 on line 154. Non-volatile memory WRITE signal from the decoder 56 is provided at point 160 on lines 162 and 164. $E^2$PROM 106 is READ under control of the signal on line 170. Memory 102, 104, 106 are selected as required by chip enable signals on line 180.

Figure 4:
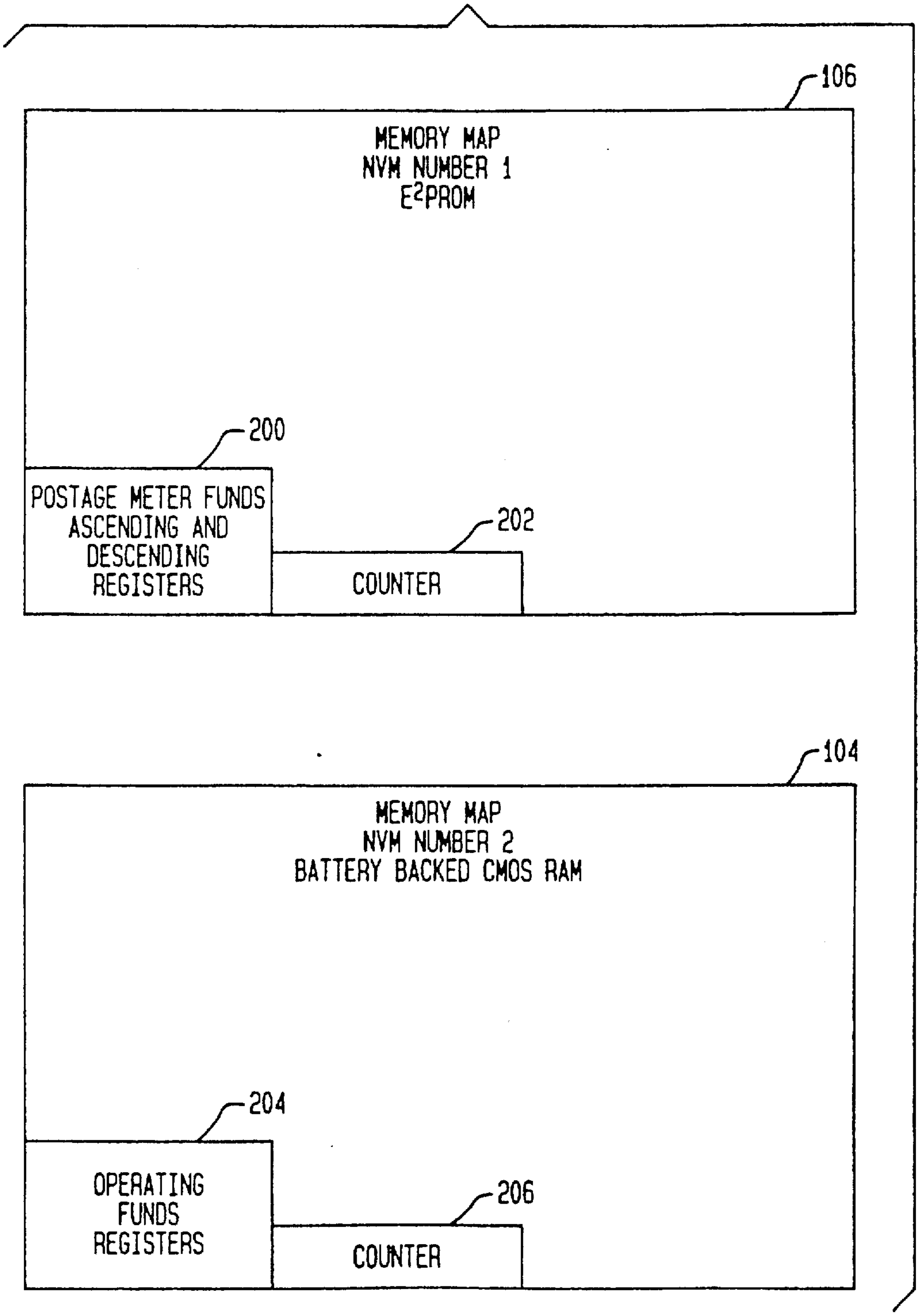
FIG. 4 is a partial map of the storage buffers in the NVM devices.

FIG. 4 shows a partial memory map of pertinent locations of each memory. Ascending and descending register information is stored in NVM No. 1, the $E^2$PROM 106, at locations indicated at 200. For best results, other information such as a control sum, piece account and the like described for example in U.S. Pat. No. 4,301,507 previously incorporated by reference, can also be maintained in the memory. It will be appreciated that while only one bank of registers is indicated redundant copies of the register may be maintained as desired. Also other registers may be utilized for storing cyclic-redundancy codes and various flags as known in the art to prevent and/or correct corrupt data. Register 202 is a counter for maintaining an account of the number of withdrawals from the funds stored in the registers 200. It will be understood that while only one register is indicated in FIG. 4 the storage of the count may also be accomplished in a ring or circular counter arrangement along with codes or flags as desired.

Registers 204 shown in the memory map of NVM No. 2, CMOS RAM 104, comprise operating registers for storing operating funds which are withdrawn in predetermined increments from the amounts stored in registers 200 and added to the funds in registers 204 when the funds in registers 204 are depleted due to metering operations. It will be understood that other registers may be utilized as discussed previously for the purpose of providing redundancy or codes and flags for allowing recovery of corrupted data as known in the art. Counter register 206 may be used if desired to provide redundancy for the information stored in the counter register of non-volatile memory 106.

In the preferred embodiment described herein, memory 106 may be an $E^2$Prom of only limited endurance since it will be accessed infrequently and it therefore can have considerably less than the conventionally required 10,000 write cycle endurance. Alternatively, it may be an NVM device such as a FLASH Technology based memory. Since the memory 104 will be accessed numerous times during postage meter operation, it must be have high endurance, but this can be traded-off against the retention requirement to enable use of such technology as battery-backed RAM or MNOS memories.

Figure 5:
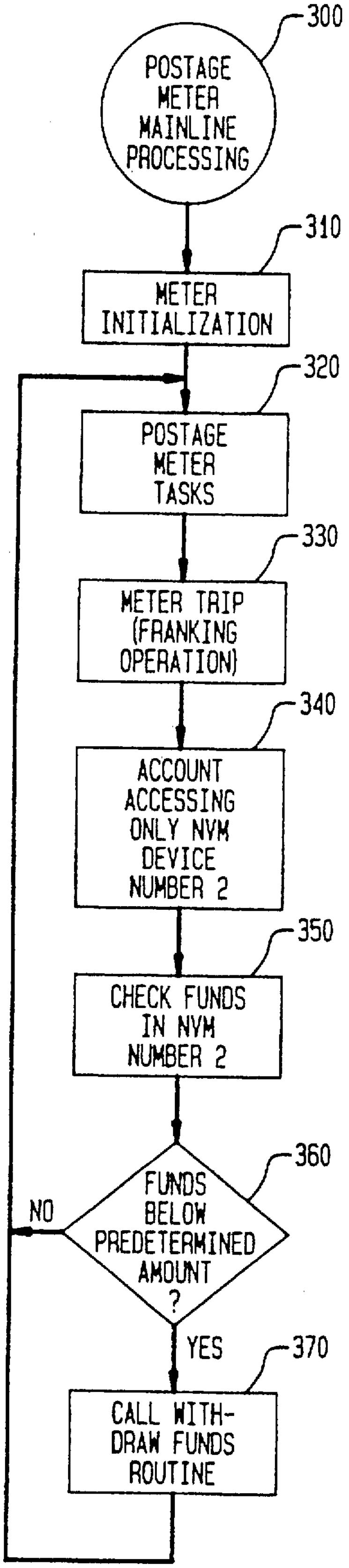
FIGS. 5 and 6 comprise a flow chart of the accounting routine in accordance with the invention.
Figure 6:
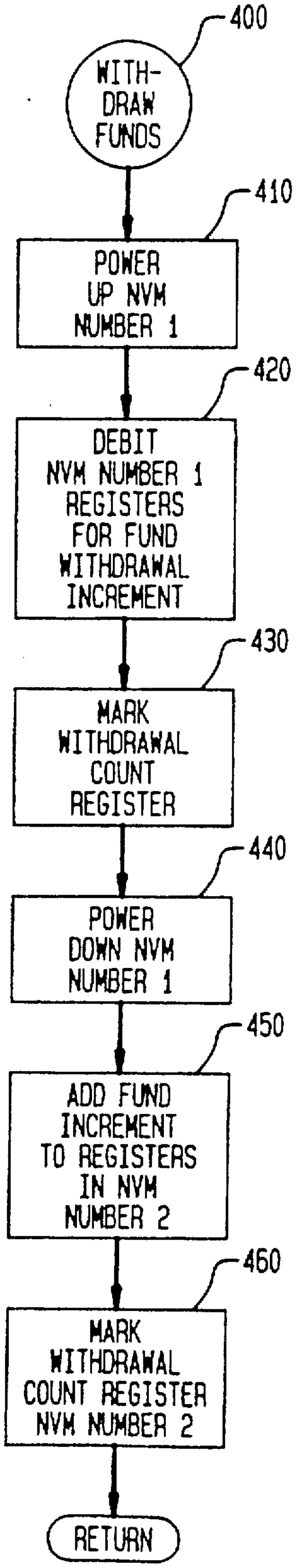

FIGS. 5 and 6 comprise a flow chart of the operation of the postage meter accounting in accordance with the invention. Turning now to FIG. 5 there is shown a mainline postage meter routine at 300. After the meter is initialized as shown at block 310, the routine turns to conventional postage meter operations, block 320, awaiting a trip signal to provide a franking operation at meter trip, block 330. The accounting for the trip is done in conventional manner as shown for example in U.S. Pat. No. 3,978,457, incorporated herein by reference, block 340, utilizing in accordance with the invention the registers only in memory 104, here designated as memory No. 2.

In a preferred embodiment, memory 106 is maintained in its power-down condition so that even if the attempt is made to access it during the franking operation there will be no writing of data to the memory 106 designated in the routine as memory No. 1. Thus only operating funds are available for accounting during the trip cycle of the postage meter.

It will be understood that known techniques for the security aspects of updating non-volatile memory can be incorporated as desired. That is, NVM No. 1 may be operated and accessed, for example, as a partitioned memory with control sum registers and redundant accounting as if it were a postage meter having limited funds. NVM No. 2 likewise can be operated in similar manner where the debit operation is the equivalent of an accounting for a franking operation of predetermined amount. Continuing the mainline routine, after the accounting is performed, the level of funds in the descending register is checked, block 350, and the outcome is tested at decision block 360. If the funds have not diminished to a predetermined level, the NO branch loops back to perform the other meter tasks. In the event that funds in the operating registers have dropped to the predetermined level, the YES branch of decision block 360 proceeds to Call Withdraw Funds routine, block 370, and once the routine is completed again loops back to block 300.

Turning now to FIG. 6, the Withdraw Funds routine is illustrated at 400. Once funds are to be withdrawn, in accordance with the preferred embodiment, the non-volatile memory No. 1 is powered to an active state, block 410, and the appropriate registers in non-volatile memory No. 1 are debited, block 420. It will be appreciated that in this operation the ascending register will be increased to reflect the withdrawal of funds, a control sum calculated, and flags or other data calculated and set as well known in the art for updating accounting in postage meters. The count register is also ticked to reflect the occurrence of the transaction, block 430.

The predetermined amount is now available for crediting to the operations registers of NVM No. 2 so that memory No. 1 is placed back into its powered down condition, block 440, and the predetermined withdrawal amount credited to the operations registers, block 450. At block 460, the transaction counter is ticked and the routine returns to the mainline processing.

It should also be appreciated that if funds are to be credited to the postage meter, the crediting operation will require powering up memory No. 1 to enable funds to be added to the registers of NVM No. 1 in known manner as described for instance in U.S. Pat. No. 4,097,023.

It will be appreciated from the foregoing that the system operation is analogous to that of a savings account withdrawal operation where in this case the bulk of the funds remain stored in safety in memory 106 (No. 1) which represents the savings account while memory device 104 (No. 2) is used to hold the funds that will be spent over a short period of time.

What is claimed is:

1. In an electronic postage meter having a non-volatile memory, printing means, and a microcomputer for controlling printing of postage value by said printing means and accounting for postage value printed in a franking operation, the improvement comprising said non-volatile memory having at least three registers, said first register for storing postage fund information representing total meter funds available for postage printing, said first register being a descending register, said second register for storing postage fund information representing total meter funds used in postage printing, said second register being an ascending register and a third register for storing operating funds for accounting at a franking operation, and said microcomputer comprising means for increasing the fund amount stored in said third register by depositing a predetermined increment of funds withdrawn from said first descending register and incrementing said second ascending register by predetermined increment of funds when the fund amount stored in said third register falls to a predetermined level, said increment of funds being equal to the cost of least two mailpieces.

2. An electronic postage meter comprising a microcomputer, printing means, non-volatile memory means, said microcomputer controlling printing of postage value by said printing means in a franking operation and accounting for value printed, said microcomputer communicating with said non-volatile memory means for storing results of the accounting of the value printed in the franking operations, said non-volatile memory means comprising a first non-volatile memory means having at least a first descending register for storing postage fund information representing meter funds available for postage printing and a second ascending register for storing postage fund information representing meter funds used in postage printing, sand second non-volatile memory means having at least a third register for storing operating funds for accounting at each franking operation, said microcomputer further controlling the accounting wherein said franking operation is accounted for in said third register and said third register is recredited by a withdrawal of funds from the first descending register of said first non-volatile memory means in predetermined increments of funds when the funds amount stored in said third register falls to a predetermined level, said increment of being equal to the cost of at least two mailpieces.

3. The apparatus of claim 2 wherein the first non-volatile memory means is powered for accessing only for the withdrawal of funds operation.

4. The apparatus of claim 2 wherein said first non-volatile memory means is a low endurance non-volatile memory device.

5. The apparatus of claim 4 wherein said first non-volatile memory means is an $E^2PROM$.

6. The apparatus of claim 4 wherein said first non-volatile memory means is a FLASH Technology based memory.

7. The apparatus of claim 2 wherein said second non-volatile memory is a battery-backed CMOS random access memory.

8. The apparatus of claim 2 wherein the first non-volatile memory means is an $E^2PROM$.

9. The apparatus of claim 2 wherein the first non-volatile memory means is a FLASH Technology based memory.

* * * * *